(12) United States Patent
Kerai et al.

(10) Patent No.: US 6,518,993 B2
(45) Date of Patent: Feb. 11, 2003

(54) MOBILE IMAGING (75) Inventors: Kanji Kerai, London (GB); Anno Koet Je, Surrey (GB); Henry Walmsley, Hampshire (GB); Justin Harris, Ash Vale (GB)

(73) Assignee: Nokia Mobile Phones Limited, Espoo (FI)

( * ) Notice: Subject to any disclaimer, the term of this patent is extended or adjusted under 35 U.S.C. 154(b) by 134 days.

(21) Appl. No.: 09/803,151

(22) Filed: Mar. 12, 2001

(65) Prior Publication Data

US 2001/0020975 A1 Sep. 13, 2001

(30) Foreign Application Priority Data

Mar. 10, 2000 (GB) .............................................. 0005888

(51) Int. Cl.[7] .............................................. H04M 11/00
(52) U.S. Cl. ..................................... 348/14.01; 348/376
(58) Field of Search ........................... 348/14.01–14.04, 348/207.99, 207.1, 373, 376

(56) References Cited

U.S. PATENT DOCUMENTS 5,550,754 A     8/1996   McNelley et al.

FOREIGN PATENT DOCUMENTS

| DE | 1963882 | 4/1998 | |
| EP | 0705047 | 4/1996 | ............ H04N/7/14 |
| EP | 0 830 000 | * 3/1998 | |
| EP | 0975132 | 1/2000 | |
| GB | 2289555 | 11/1995 | ............ G06F/3/00 |
| WO | 97/26744 | 7/1997 | |
| WO | 9819435 | 5/1998 | ............ H04M/1/02 |

* cited by examiner

*Primary Examiner*—Wing Chan
(74) *Attorney, Agent, or Firm*—Antonelli, Terry, Stout & Kraus, LLP (57) ABSTRACT

This invention provides a way of making use of a headset jack socket connector of a mobile phone for allowing in addition the input of a video camera module. The solution presented involves detecting when a video camera is inserted into the mobile phone and then switching the mobile phone to receive video signals from the camera module. Therefore, efficient use is made of an existing feature of a mobile phone, thereby saving space. Furthermore, a camera module so inserted in the jack socket can be rotated between different positions to allow the user to take different images.

14 Claims, 12 Drawing Sheets

MOBILE IMAGING

BACKGROUND OF THE INVENTION

The present invention relates to imaging, and in particular to digital imaging in a portable radio communication device. Furthermore, this invention relates more particularly to a portable radio communication device having a connector for connecting an imaging device thereto.

The use of personal computers, in particular laptops, and personal communication devices, in particular mobile phones, is now commonplace. Much development work is being invested in enhancing the capabilities of laptops/mobile phones. One particular proposal has been to introduce to laptops/mobile phones additional functionalities such as still and moving image capturing, scanning and printing, these being provided by on-board or connectable cameras, scanners, and printers respectively. Digital video in particular offers a great many advantages over traditional analogue systems, supporting services such as video telephony and multimedia applications. It is envisaged that video cameras could be connected up with laptops and mobile phones as either integral parts thereof, thus making up part of the electronic apparatus as a whole, or as add-on peripheral devices provided in the form of detachably connectable modular accessories.

Furthermore, it has been noted that rather than arrange the video camera in a fixed relationship with the main device (e.g. laptop/mobile phone), it would be more useful if the camera were able to adopt a range of positions in relation to the main device. That is, it would significantly increase the usefulness of the camera unit, and the apparatus as a whole, if whilst being electronically connected to the laptop/mobile phone the camera unit could be moved about independently of the laptop. Thus there is a need for there to be a degree of relative movement between the camera and the main apparatus.

Figure 1:
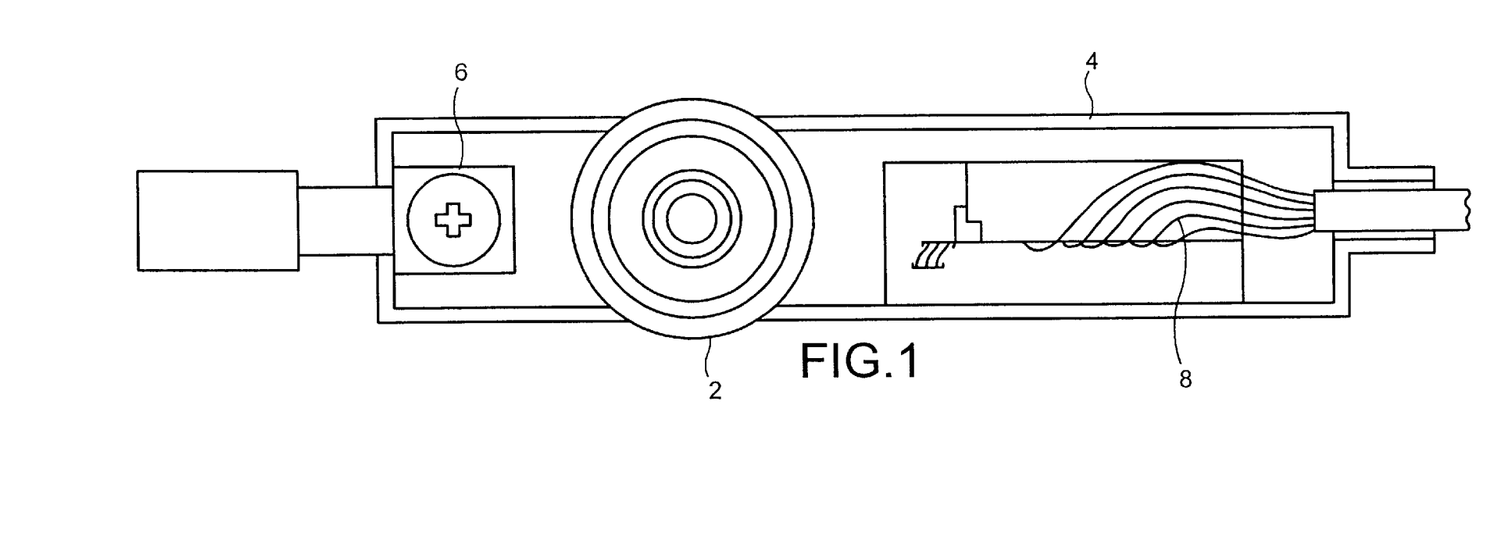
FIG. 1 is an illustration of a prior art pivoting electrical connection.

There are products already available which combine a video camera unit with a laptop computer. Typically in such a laptop computer, the video camera is mounted such that it is capable of turning with respect to the main body of the laptop, i.e. rotationally mounted. So whilst the laptop itself remains relatively static, the video camera may be rotated about the pivot axis to take a number of video frames. FIG. 1 schematically illustrates the connecting wire and pivot arrangement used in the video camera module of this particular product. As illustrated, the camera module comprises a video camera 2 disposed centrally in a housing 4, a pivot mechanism 6 being provided at one end of the camera housing 4 and a collection of wires 8 extending from the other end of the housing. The pivot mechanism 6 is a relatively large and solid mechanism that effectively supports the camera module in a cantilever fashion in relation to the main body of the laptop. The mechanism consists of a small framework (to the left of the figure) that is secured to the main body of the laptop and a central spindle extending therefrom and terminating in a pressed sheet metal flat portion which is screwed down in the camera module. In terms of electrical connections, the arrangement used in this particular device is to connect the video camera to the laptop by a series of separate wired connections between the video camera unit and a PCB provided in the laptop. As can be seen there are a number of individual wired connections and these are in series with one another and intertwined. The wired connections are loose and provided with a sufficient amount of slack so as to allow pivoting of the video camera unit about the axes of the wires. Each wired connection is soldered at each end to contact points on the video camera unit and the PCB. Whilst this arrangement of separate wired connections is perfunctory in allowing pivotal electrical connection between the video camera unit and the laptop it suffers a number of problems. The wires move in a tortional twisting action about their respective axes and are therefore prone to stretching which may lead to the introduction of errors in the video pictures transmitted between the video camera and the laptop. Also chaffing of the wires is experienced because they tend to rub against one another during movement of the video camera unit. Furthermore, through constant pivoting of the camera, there is a serious risk that the wires will be pulled away from their soldered end connections.

SUMMARY OF THE INVENTION

Against this background, the present invention provides a portable radio communication device having a camera module associated therewith, the portable radio communication device having a connector for detachably connecting thereto the camera module or one or more other electrical devices, the camera module and the one or more other electrical devices being detachably connectable to the portable radio communication device individually in a selectable manner, the connector comprising cooperating circular cross sectioned plug and socket arrangement between the camera or the one or more other electrical devices and the portable radio communication device, thereby allowing the camera module to rotate in relation to the portable radio communication device between different view taking orientations, the portable radio communication device having electrical interface circuitry associated with the connector and enabling transfer of electrical signals between the camera module or the other electrical devices and the portable radio communication device in the said individual selectable manner, the electrical interface circuitry comprising
detection means operative to detect the presence of the camera module from the other electrical devices,
and switching means operable to switch between electrical coupling of the one or more other electrical devices and electrical coupling of the camera module in response to detection of the presence of the camera module so as to place the portable radio communication device in a condition to receive imaging signals from the camera module.

The invention provides for a robust pivoting electrical connection between one electrical unit and another. It is found that in comparison to the prior art, the design of the invention is low cost, has high flexibility, high durability and high reliability. It is easier to manufacture than the hardwired arrangement of the prior art, which is by its nature awkward. In the prior art, the video camera would require several electrical input and output connections, perhaps as many as ten. This many connections making up a pivot constituted by a series of simple wires is bulky and prone to wear. The present invention by comparison is neat, compact and robust. Also the arrangement of the present invention permits an unlimited number of rotations in any direction of one of the electrical devices with respect to the other. This represents a significant advantage over the prior art in which the inter-twined wires afford only a finite and relatively few number of rotations before the wires tighten up and prevent any further rotation. Thus, the present invention combines the pivoting requirement and the electrical connection requirement effectively and elegantly in a single entity.

In a preferred embodiment, the one or more other electrical devices comprise a headset and the detection means is operative to detect the presence of the camera module or the headset, and the switching means is operable to switch between electrical coupling of the headset and electrical coupling of the video camera module in response to detection of the headset or the video camera module.

Through the provision of interface electrical circuitry, advantage is taken of the jack socket electrical connector, ordinarily reserved for a headset to be used with the portable radio communication device, as a means for connecting the camera module to the portable radio communication device.

Therefore, camera functionality may be added to a mobile phone without the need for adding a further camera-dedicated connector to the mobile phone handset.

Accordingly, the present invention provides for a relatively cheap camera accessory to be used with a mobile phone without the need for complex mechanical structures.

BRIEF DESCRIPTION OF THE DRAWINGS

The present invention will now be described by way of example with reference to the following drawings in which.

DETAILED DESCRIPTION OF THE INVENTION

Figure 2A:
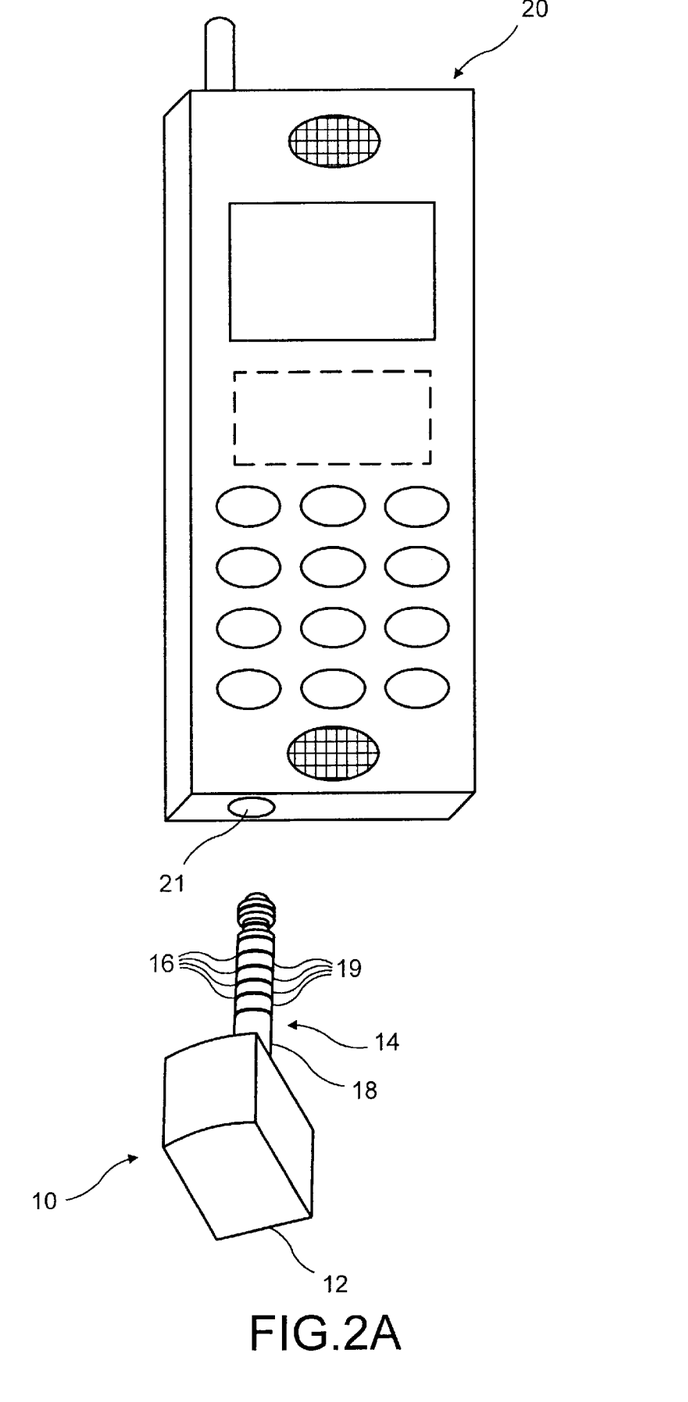
FIGS. 2a and 2b are perspective views of a radio telephone and a video camera module in two different embodiments of the present invention.
Figure 2B:
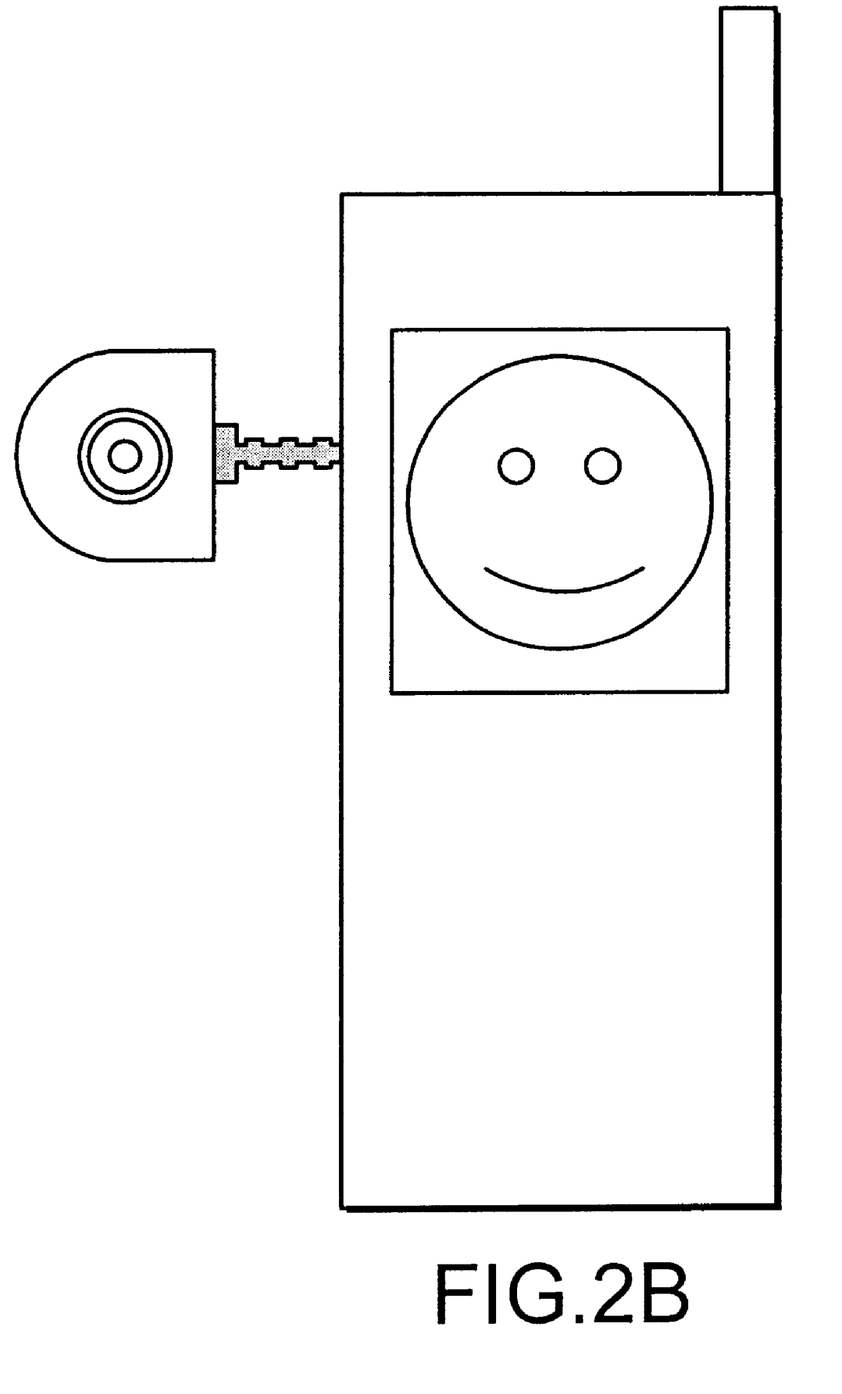

Referring initially to FIG. 2a, there is shown a camera module 10 and a radiotelephone 20 in accordance with an embodiment of the present invention. The camera module 10 is shown to be connectable to the radiotelephone 20 by means of a connector socket 21 which is provided in the bottom sidewall of the radio telephone. From a convenience of use perspective it may be preferable to provide the socket on a sidewall of the radiotelephone so that the camera module may be rotated about the horizontal axis with reference to the radiotelephone as shown in FIG. 2b. This is a matter of design choice.

The camera module 10 comprises a video camera unit 12 extending into an electrical connector plug 14. The camera unit 12 includes the necessary camera components and circuitry for a fully functioning video camera module.

Referring to the connector plug 14, this has at axially spaced apart locations along the length a series of transverse electrical contacts rings 16. The number of the contact rings are determined by the particular electrical connections required for the video camera module (these will be discussed in detail later). The plug 14 also has a series of bearing surfaces which are the areas in FIG. 2 designated 18 and 19 which are designed to facilitate the rotation of the plug when the camera module is connected to the radiotelephone via the socket 21 of the radiotelephone. The bearing surfaces are designed so as to provide a good mechanical fit with the socket of the connector and are designed to be able to be reliable up to a given number of rotations of the shaft. The bearing surface is made from any suitable bearing material for example PTFE and could on a larger scale comprise a bushing or comprise roller needle bearings.

Figure 3:
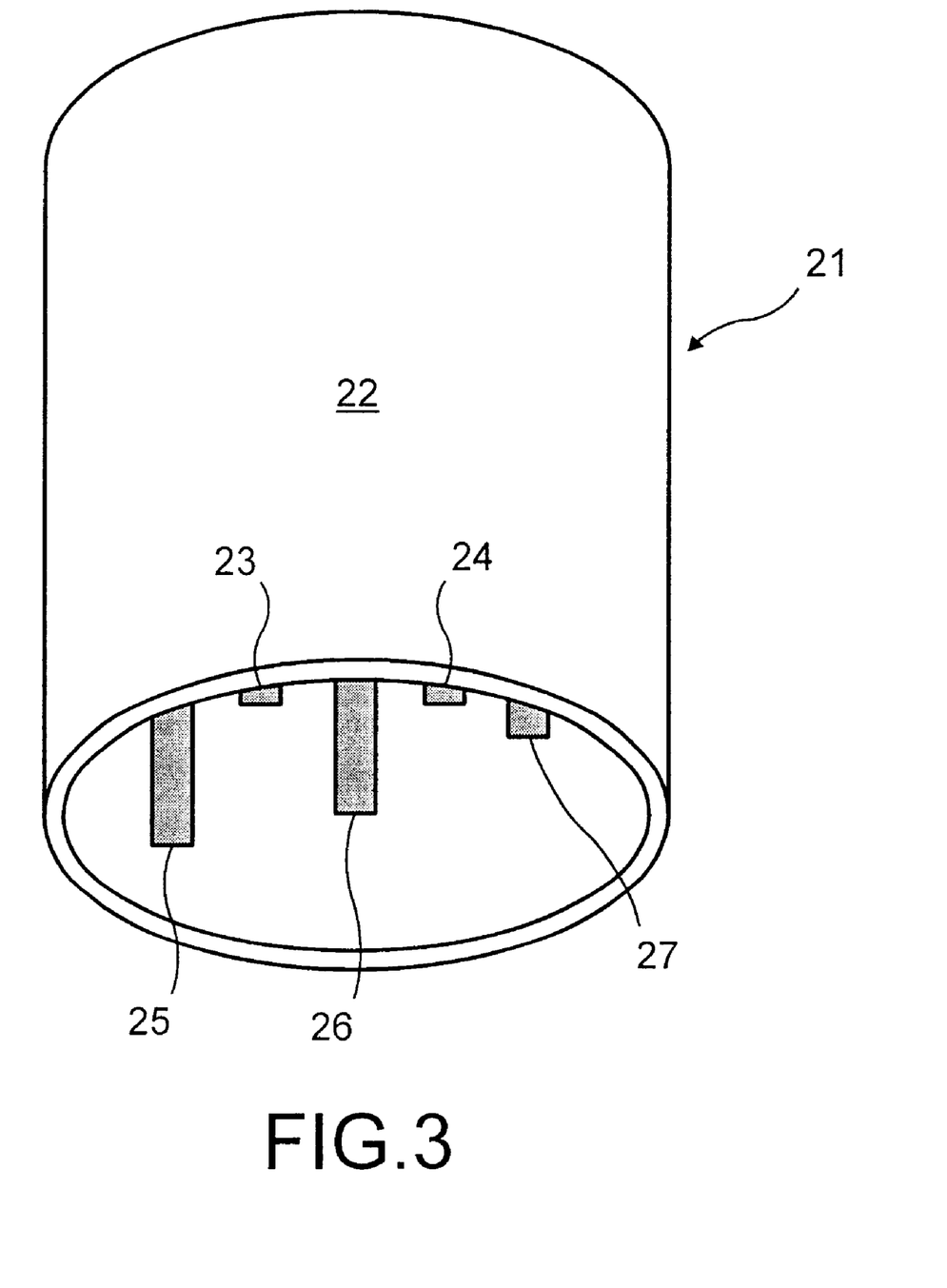
FIG. 3 shows a socket connector of the radio telephone of FIGS. 2a and 2b.

As previously mentioned, the radio telephone 20 includes a connector socket 21 which as illustrated in FIG. 3 comprises a female body 22 and five electrical connectors 23, 24, 25, 26, 27. The electrical connectors 23 to 27 are circumferentially disposed at axially spaced locations inside the perimeter of the connector body 22 and each having a wiper contact associated therewith.

Such a connector socket of a radiotelephone is typically used to connect to the radiotelephone external electrical devices, such as a headset, to afford the radiotelephone additional functionality, in the case of a headset to allow a hands-free mode of operation of the radiotelephone. Alternatively, or additionally, such a connector may used for receiving a plug of a charging unit for charging the battery of the radiotelephone.

In the present invention, the camera module 10 is coupled with the radiotelephone 20 via the electrical contact rings 16 on the connector plug 14 mating with the electrical connectors 23, 24, 25, 26, 27 of female socket body 22. The arrangement of the present invention is such that the socket 21 can be used for connection of any number of different external electrical devices including the camera module, and in particular for interchanging use between a camera module and a headset. A function of the preferred form of the present invention being to detect which one of the camera module or headset is connected to the phone at any given time and then switching to electrically connect the radiotelephone to the camera module or headset according to which one is detected. In generalised terms, the radiotelephone has discrete electrical areas on its electrical engine board dedicated to receive different input signals from a number of external electrical devices corresponding respectively to different modes of operation; the connector socket acts as an inlet port for allowing mechanical coupling of the different external electrical devices on an individually selectable basis; and an electrical interface determines which of the external electrical device has been plugged into the socket and effectively routes signals between the external electrical device and the corresponding electrical areas on the engine board. The present invention in a specific context is concerned with alternately connecting a camera module into a radiotelephone and a headset into the radiotelephone through a common connector and providing electrical interface circuitry comprising detection means for detecting from the plurality of modes of operation that the video camera module has been attached to the portable radio communication device and switching means for switching between the plurality of modes of operation to select the video camera mode of operation.

In the preferred embodiment of the present invention, as explained previously the connector socket 21 of the radiotelephone has five electrical connectors 23 to 27. So as to electrically couple a camera module to the electrical engine board of the radiotelephone, the connector 21 receives 5 electrical signal inputs fed to it from the camera module and these are multiplexed through to 5 electrical contact points on the engine board of the radiotelephone.

The electrical contact points on the engine board for the video camera input signals consist of:

0V—Ground

Vcam—Camera power

CS—Chip select
Camclk—Camera clock signals
Tx, Rx—Transmit and receive data signals However, the camera module 10 may have more than 5 output signals. In one example, the camera module may comprise the following 10 signal outputs:

Gnd, Gnd, DaClk, TxDa, RxDa, CSX, ExtClk, Vctrl, Vbat, VDDKI.

Thus in order to be able to interface the 10 signal outputs of the camera module with the 5-way socket connector 21 of the radiotelephone, the number of signals input to the radiotelephone are combined in the camera in accordance with the following:

Combine VDDI and Vctrl

VDDI is a supply (1.8 V) to the I/O logic on the camera module. Vctrl is a control signal to turn on the on-board regulator. Vctrl logic voltage is 1.8 V and hence the signals can be joined together. The regulator can turn on when the I/O power is supplied to the module.

Change Vbat to Vcam

Vbat is used to supply the power to the on-board regulator. Instead, Vcam (regulated 2.78 V, 50 mA) can be available from the radiotelephone. The module can use this to power the on-board components and regulate to desired levels for the CCD. The same supply can be used to generate the I/O voltage by an on-board 1.8 V regulator. The regulator output connects to VDDI and Vctrl as explained above.

Combine RxDa and TxDa to Da

These signals can be combined to be simplex interface (i.e. master enables write, and timed read). Since the engine is the controller, it can write the control data to the module and then read stream of image data. All data transfer is effected using the DaClk.

Combine GND, GND

Both the GNDs can be combined since there is only one power connection from the radiotelephone to the camera, and also as the current is not very high there is little risk of problems due to groundbounce. The camera module takes approximately 35 mA from Vbat.

ExtClk

This clock is used on the camera module by the DSP on the camera module to process data, and it can be derived from system clock rate of the engine.

It does not have to be related to the system clock, it is the only high-speed clock available from the engine.

DaClk

Internally generate data clock DaClk from ExtClk. DaClk can be ExtClk divided by 2. This requires a flip flop on the camera module end. The ASIC which generates the ExtClK part of the engine already will support a half Clk signal (÷2).

Figure 4:
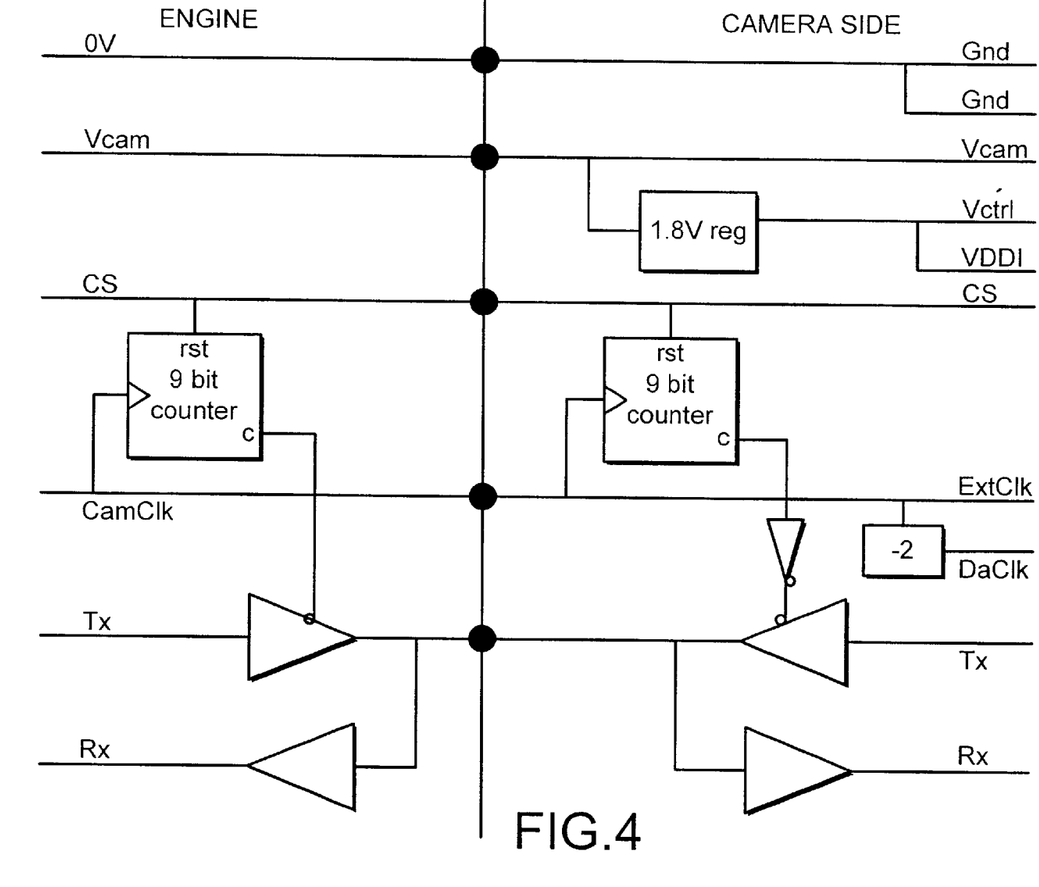
FIG. 4 is one embodiment of an interface for the camera accessory module of the present invention.

FIG. 4 outlines these combinations and also the relationship of the combined signals with the contact points of the engine board. The 5 signals are output to the phone through the electrical contact rings 16 of connector plug 14 of the camera module.

As has been explained, the headset and the camera module accessory share a common connector. The interface circuitry required to allow isolation of the various respective signals and switching between these two modes of operation will now be described with reference to FIGS. 5a to 5d which show schemes for multiplexing the camera and the headset signals. FIG. 5e schematically shows in overview the basic interfacing scheme, and FIG. 5f give details of the connecting correlations between the headset connector and the camera connector.

Figure 5A:
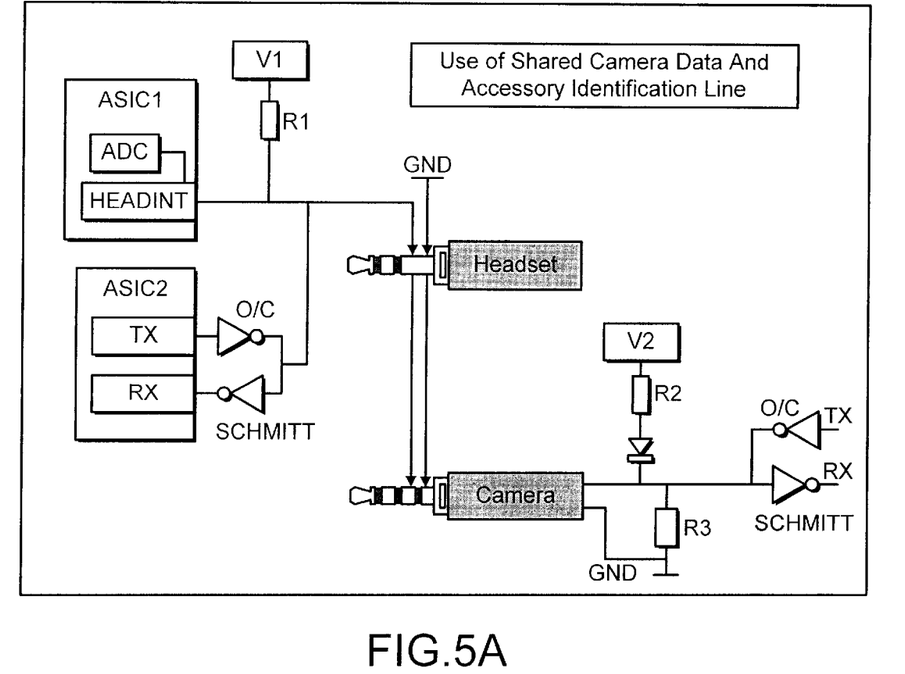
FIGS. 5a to 5f show multiplexing of the camera to the mobile phone engine.

FIG. 5a depicts use of Shared Camera Data and Accessory Identification Line. The headset interrupt signal (HEADINT line) shares with the camera data line. When a headset is plugged in, the HEADINT line is pulled to ground as the socket contact is connected to the grounded sleeve of the four-way headset plug. When a camera module is connected the socket contact connects to the extra jack ring contact. The pull-down resistor in the unpowered camera will result in about 0.5 V on HEADINT which can be detected by the ADC connected to HEADINT inside ASIC 1. HEADINT falling to less than approximately 1.2 V causes an interrupt then the system can read the ADC. HEADINT rising also causes an interrupt and can be used to detect headset removal. While the camera is in operation the interrupts must be disabled, or the camera data will create continuous interrupts. The camera is polled by software to ensure that it is still connected and the disconnection of the camera is detected by a lack of response from the camera.

Figure 6:
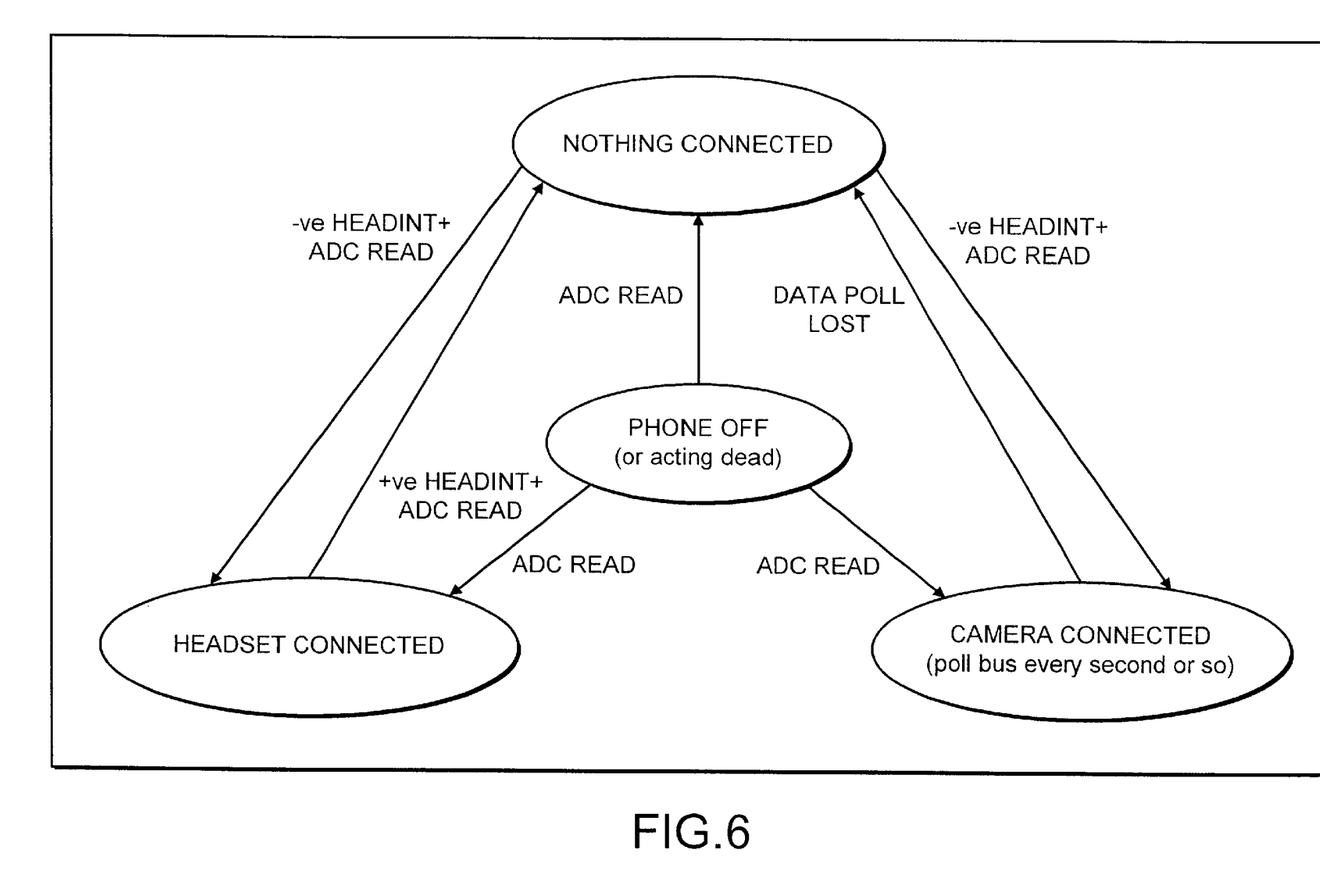
FIG. 6 is a detection state diagram for the embodiment shown in FIGS. 5a to 5f.

As shown in the FIG. 6 state diagram there is only one state where the radiotelephone 'forgets' what is connected to the socket 21 and that is the off state. On power up, and in unspecified cases, the radiotelephone is configured to default to headset mode. When the radiotelephone is powered up, the headset detection ADC is read once the power supplies have stabilised. This will allow the appropriate mode to be selected for the camera enable (CAM_EN) select line. This drives the multiplexing switches to the correct state.

Figure 5B:
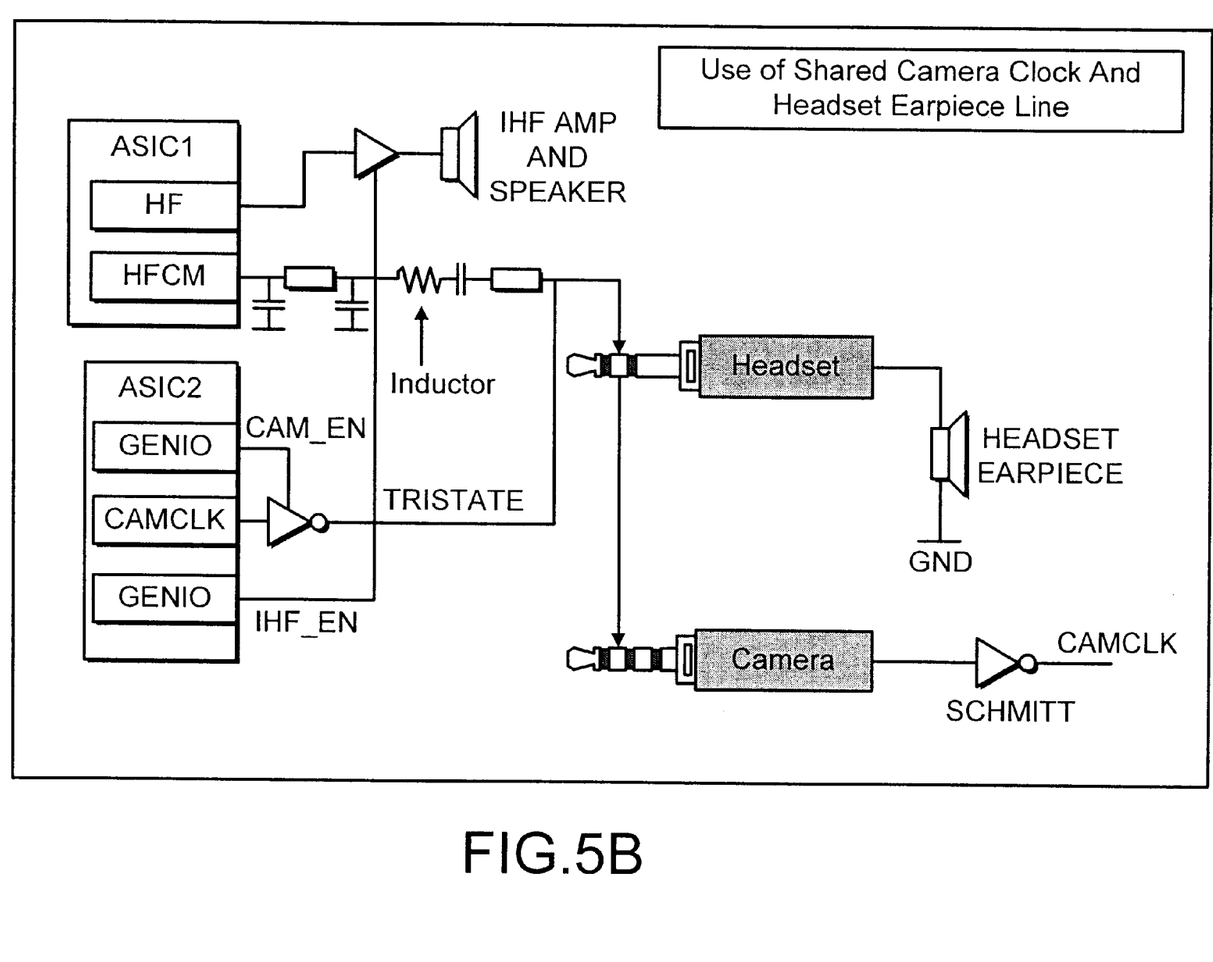

FIG. 5b shows use of shared camera clock and headset earpiece. The headset earpiece is typically a 32Ω device. The analogue switch used for the microphone line has an impedance which varies from about 5Ω to 4Ω depending on where between the supply rails the signal voltage happens to be, i.e. the impedance is non-linear and causes distortion. So with a 32Ω load a switch cannot be used. This described embodiment is also designed to support internal hands-free (IHF) functionality in which the phone has a built-in microphone capable of receiving and distinguishing audio signals (eg user speech) when the user is not holding the phone to his/her mouth, but has it placed on for example a table top. Thus, there is a need to drive the IHF amplifier at the same time that the camera is being used and for the IHF to be driven at the same time as the headset, when it is plugged in. The limited driver resources and the "one audio output at a time" switching of the ASIC 1 audio mux leads to the scheme shown in the diagram.

When in camera mode, ASIC 1 is set such that the HF and HFCM (hands-free common mode) drivers are enabled but only the HF output is driven with the audio signal. The d.c. level present on HFCM is prevented from upsetting the CAMCLK signal by the d.c. blocking capacitor. The fully active HF output allows the IHF to operate while the camera is being used. The CAMCLK driver is on and is driven with the camera clock signal. This clock signal is effectively isolated from the shorting effects of the HFCM driver by an inductor. This presents an impedance which the clock driver can drive easily. The capacitors to ground around the inductor form a low-pass filter to stop the clock signal from reaching the HFCM driver and possibly disrupting ASIC 1. The resistors are part of the usual headset circuit and are so arranged as to further attenuate the high frequency clock harmonics which may be above the effective blocking range of the inductor.

When in headset mode, both the HF and HFCM drivers are enabled as before, but now audio can be routed out of both. The IHF enable line determines whether the IHF is on at the same time as the headset. This is a requirement during ringing tones. The inductor presents about 1Ω impedance, and the capacitors present more than 2.6Ω impedance at 6 kHz.

Figure 5C:
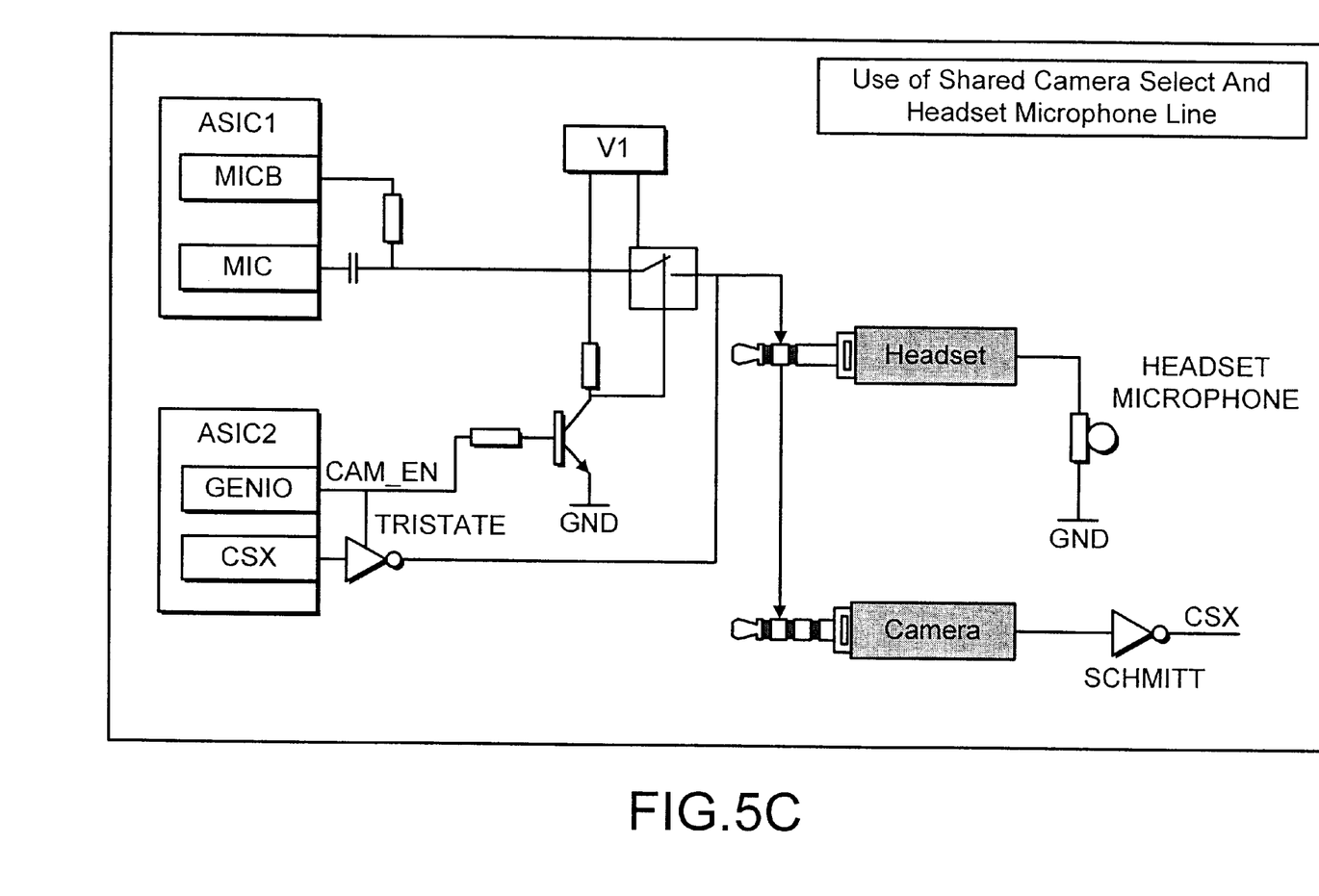

FIG. 5c shows use of shared camera chip select (CSX) and headset microphone line. When in headset mode the standard microphone input and bias resistor arrangement are connected through to the headset socket via an electronic FET switch. The high impedance of the ASIC 1 microphone input means that the mic signal is passed through the "on" impedance of the switch with no audible effect. The camera CSX line is tristated in headset mode and the tristate output does not add noticeably to the microphone noise level. The same applies to the switch. The switch requires the enable to go all the way to the switch supply line and so has a transistor level shifter. This also provides the required logic negation. When in camera mode, the switch to the microphone line is opened. The CSX logic driver is enabled and this drives the logic signal to the camera. The open switch provides a high impedance to the logic signal and avoids any damage to the ASIC 1 microphone inputs.

Figure 5D:
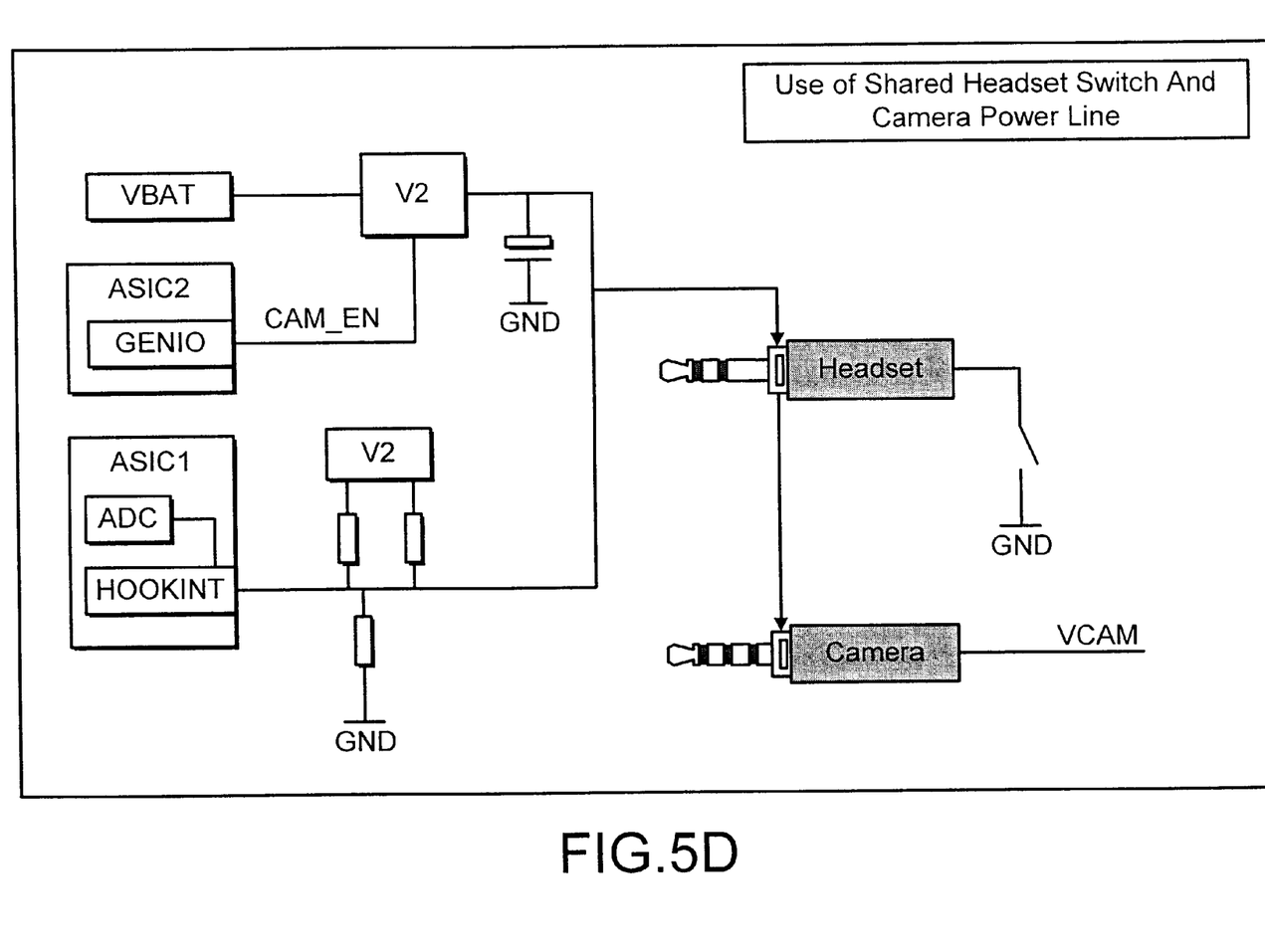
Figure 5E:
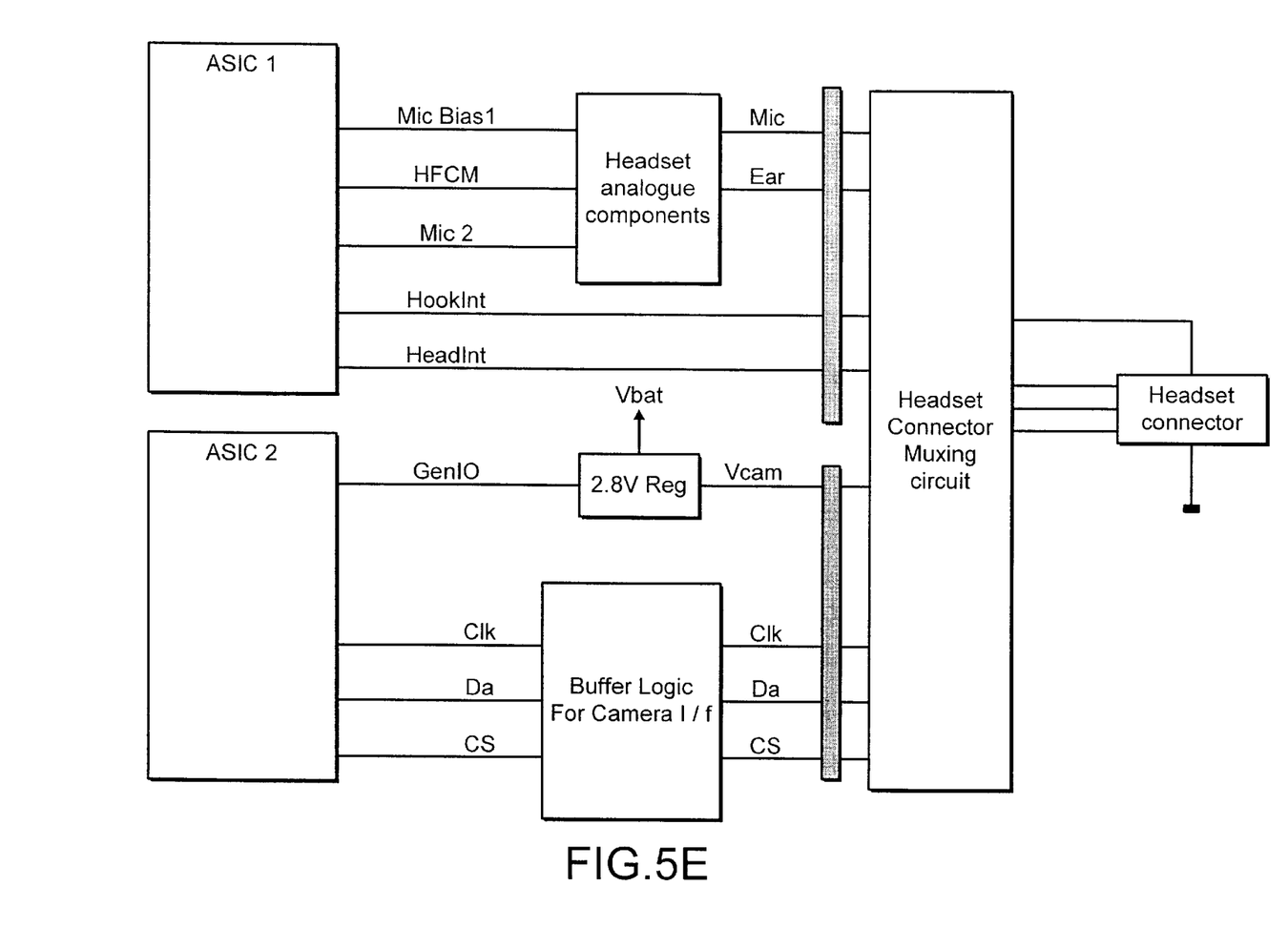
Figure 5F:
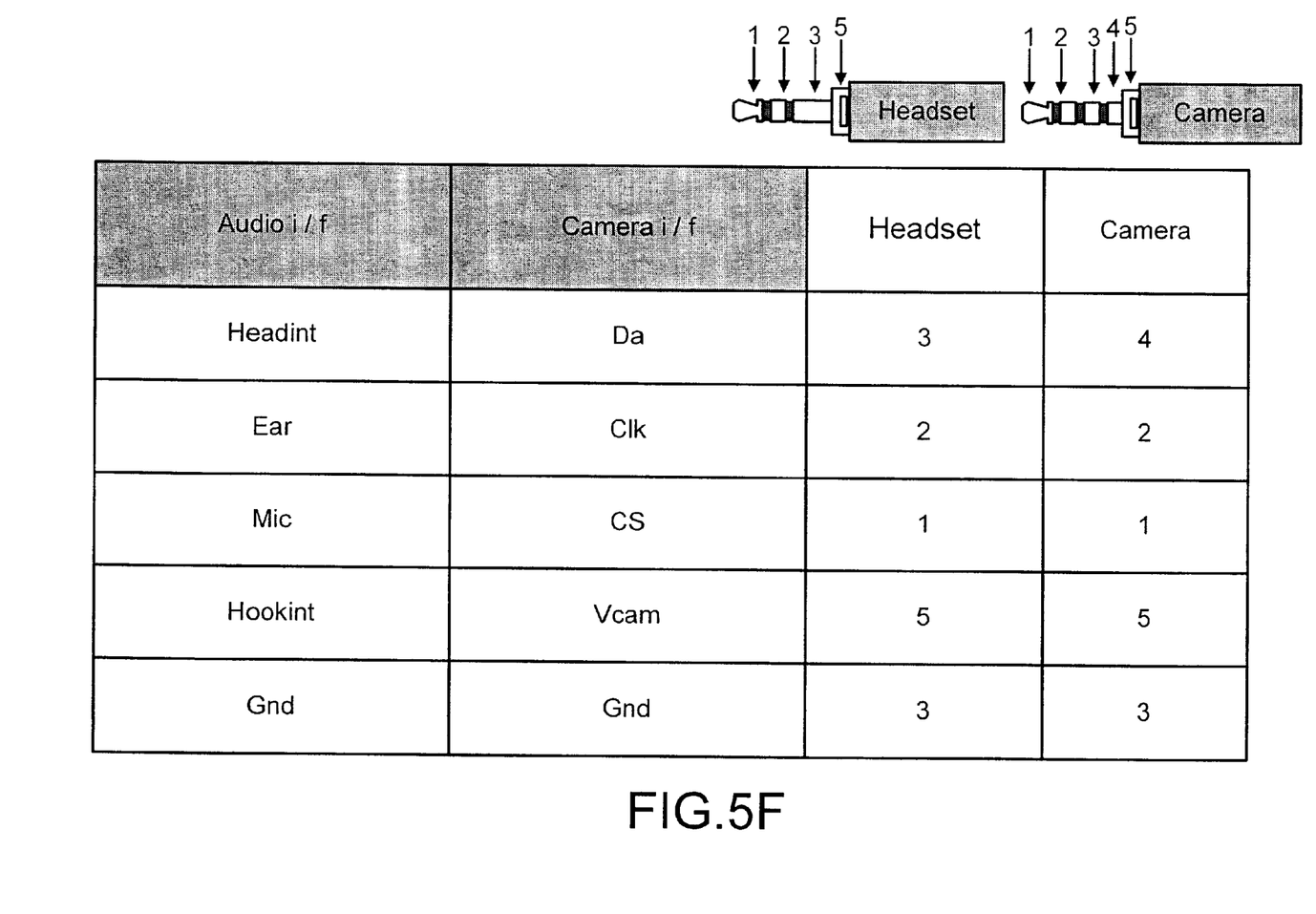

FIG. 5d shows use of shared headset switch and camera power line. The outer ring of the four-wire headset socket is found to be a good connection to attach the camera power to, as it can physically not be connected at random to the other signals upon insertion of the plug. The voltage supplied to the camera is $V_2$=3.0 V at a maximum of 150 mA. The regulator is fully short circuit protected and will fold-back to less than 150 mA when shorted. The power is only enabled when a camera has been identified. The output of the regulator is high impedance when disabled. This allows the line to be used to detect the closing of the headset switch when in headset mode. The pull up resistor to $V_1$=2.7 V allows easy detection of the headset switch via interrupts. A headset on-hook/off-hook switch (HOOKINT) provided in the form of a button on the headset will go low when the button is pressed on the headset. There is a time constant associated with the button so fast double-clicks on this button will not be detected. The button can be used for various purposes e.g. call origination and call dropping. It is not usual for a HOOKINT signal to be seen in either in camera or 'nothing connected' mode. If this occurs then the 'nothing connected' state must be entered and the ADC measured to check what is really connected. The software must ignore the interrupts which will occur on HOOKINT when the VCAM regulator is turned on and off. The rating of the switch in the headsets is sufficient to take the regulator short-circuit current without difficulty.

Thus, through this series of multiplexed connections the same connector socket of the radiotelephone can be used for both camera and headset functionality's. The detecting means detects between insertion of the headset connector or the video camera module, and thus effectively detects the presence or absence of the camera module. And the switching means responds to detection of the headset or the video camera module and accordingly switches between headset functionality and video camera module functionality.

Moreover, by modifying or extending the interfacing circuitry described above it would be apparent to a skilled person in the art that other peripheral electrical devices such as chargers, scanners and the like could in addition be coupled to the radiotelephone using one and the same socket connector.

Accordingly, the present invention may be embodied in other specific forms without departing from its essential attributes. For example, the plug and socket arrangement between the radiotelephone and the camera module may be reversed. Reference should thus be made to the appended claims and other general statements herein rather than to the foregoing description as indicating the scope of invention.

Furthermore, each feature disclosed in this specification (which term includes the claims) and/or shown in the drawings may be incorporated in the invention independently of other disclosed and/or illustrated features. In this regard, the invention includes any novel feature or combination of features disclosed herein either explicitly or any generalisation thereof irrespective of whether or not it relates to the claimed invention or mitigates any or all of the problems addressed.

The appended abstract as filed herewith is included in the specification by reference.

What is claimed is:

1. A portable radio communication device having a camera module associated therewith, the portable radio communication device having a connector for detachably connecting thereto the camera module or one or more other electrical devices, the camera module and the one or more other electrical devices being detachably connectable to the portable radio communication device individually in a selectable manner, the connector comprising cooperating circular cross sectioned plug and socket arrangement between the camera or the one or more other electrical devices and the portable radio communication device, thereby allowing the camera module to rotate in relation to the portable radio communication device between different view taking orientations, the portable radio communication device having electrical interface circuitry associated with the connector and enabling transfer of electrical signals between the camera module or the other electrical devices and the portable radio communication device in the said individual selectable manner, the electrical interface circuitry comprising
detection means operative to detect the presence of the camera module from the other electrical devices,
and switching means operable to switch between electrical coupling of the one or more other electrical devices and electrical coupling of the camera module in response to detection of the presence of the camera module so as to place the portable radio communication device in a condition to receive image signals from the camera module.

2. A portable radio communication device having a video camera module associated therewith, the portable radio communication device having connection means for detachably connecting thereto the video camera module or one or more other electrical devices, the video camera module and the one or more other electrical devices being detachably connectable to the portable radio communication device individually in a selectable manner, the connection means comprising a mechanical coupling and electrical interface circuitry, the mechanical coupling being in the form of a plug and socket arrangement between the video camera module or the other electrical devices and the portable radio communication device, the arrangement allowing the video camera module to rotate relative to the portable radio communication device between different view taking orientations, the electrical interface circuitry supporting electrical connection of the video camera module or the other electrical devices to the portable radio communication device in the said individual selectable manner, the electrical interface circuitry comprising
  detection means operative to detect the presence of the camera module from the other electrical devices,
  and switching means operable to switch between electrical coupling of the one or more other electrical devices and electrical coupling of the video camera module in response to detection of the presence of the video camera module so as to place the portable radio communication device in a condition to receive video signals from the video camera module.

3. A portable radio communication device according to claim 1 wherein the one or more other electrical devices comprises a headset and the detection means is operative to detect the presence of the camera module or the headset, and the switching means is operable to switch between electrical coupling of the headset and electrical coupling of the video camera module in response to detection of the headset or the video camera module.

4. A portable radio communication device according to claim 1, wherein the detection means and the switching means are provided in the form of multiplexing circuitry.

5. A portable radio communication device according to claim 4, wherein said multiplexing circuitry comprises common electrical connection lines between selected electrical signal lines of the camera and selected electrical signal lines of the headset.

6. A portable radio communication device according to claim 5, wherein said multiplexing circuitry comprises any one or combinations of the following electrical connections:
  a shared line between camera data and headset identification,
  a share line between camera clock and headset earpiece,
  a shared line between camera select and headset microphone,
  a shared line between a camera power and a headset switch.

7. A camera module adapted to be detachable connected to a portable radio communication device as defined in claim 1.

8. A portable radio communication device having a camera module and one or more other electrical devices associated therewith,
  the portable radio communication device having a connector for detachably connecting thereto the camera module or the one or more other electrical devices,
  the camera module and the one or more other electrical devices being detachably connectable to the portable radio communication device via the connector in an individually selectable manner,
  the portable radio communication device having electrical interface circuitry associated with the connector and enabling transfer of electrical signals between the camera module or the one or more other electrical devices and the portable radio communication device in the said individual selectable manner,
  the electrical interface circuitry comprising switching means operable to switch between electrical coupling of the one or more other electrical devices and electrical coupling of the camera module to the portable radio communication device in depedence upon which selected one of the one or more other electrical devices or the camera module is coupled to the portable radio communication device via the connector.

9. A portable radio communication device according to claim 2, wherein the one or more other electrical devices comprises a headset and the detection means is operative to detect the presence of the camera module or the headset, and the switching means is operable to switch between electrical coupling of the headset and electrical coupling of the video camera module in response to detection of the headset or the video camera module.

10. A camera module adapted to be detachable connected to a portable radio communication device as defined in claim 2.

11. A camera module adapted to be detachable connected to a portable radio communication device as defined in claim 3.

12. A camera module adapted to be detachable connected to a portable radio communication device as defined in claim 4.

13. A camera module adapted to be detachable connected to a portable radio communication device as defined in claim 5.

14. A camera module adapted to be detachable connected to a portable radio communication device as defined in claim 6.

* * * * *